Patented Jan. 1, 1929.

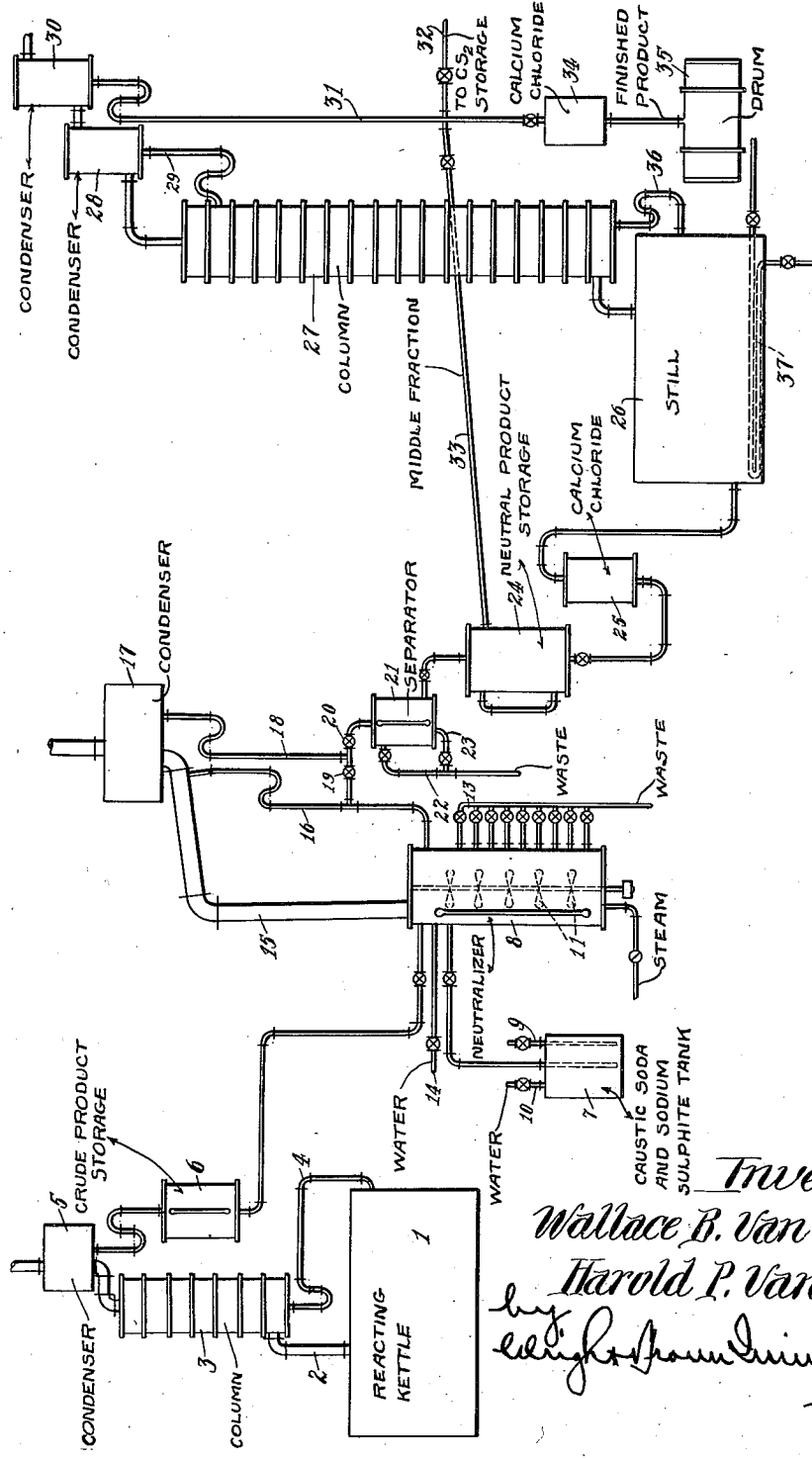

1,697,483

UNITED STATES PATENT OFFICE.

WALLACE B. VAN ARSDEL, OF BERLIN, AND HAROLD P. VANNAH, OF GORHAM, NEW HAMPSHIRE, ASSIGNORS TO BROWN COMPANY, OF BERLIN, NEW HAMPSHIRE, A CORPORATION OF MAINE.

PURIFICATION OF CRUDE-CARBON TETRACHLORIDE.

Application filed March 6, 1925. Serial No. 13,509.

This invention relates to the purification of crude carbon tetrachloride resulting from the chlorination of carbon disulphide. Carbon tetrachloride is prepared technically by the chlorination of carbon disulphide in the presence of a chlorine carrier. It may be carried out by the direct chlorination of carbon disulphide in the presence of powdered antimony or iron as a catalyst to produce tetrachloride by the following reaction:

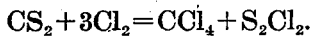

The sulphur chloride resulting from the foregoing reaction may then react separately with more carbon disulphide in the presence of iron filings as a chlorine carrier to produce carbon tetrachloride by the reaction

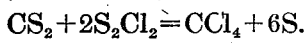

The sulphur formed thereby may be re-employed in producing the carbon disulphide.

Or the technical preparation of tetrachloride may be carried out in one step by the direct reaction of the sulphur chlorides with carbon disulphide. These reactions between the chlorides of sulphur, viz: sulphur monochloride or sulphur dichloride with carbon disulphide, in the presence of iron as a catalyst, do not go entirely to completion but reach an equilibrium, an analysis at this point showing the presence of substantial amounts of unreacted carbon disulphide and sulphur chloride. During this reaction, moreover, many intermediate or side reactions take place, simultaneously forming a variety of small amounts of other reaction products which are more or less volatile, such as thiophosgene, $CSCl_2$, and the chlormercaptans, especially perchlormethyl mercaptan, $CCl_3SCl$. Thus, when the reaction has reached equilibrium and the reaction mixture is distilled, practically all of the sulphur formed by the reaction and most of the unreacted sulphur chloride, both of which are substantially less volatile than other compounds, remain behind as a residue in the reaction still, together with relatively small amounts of carbon tetrachloride and the other reaction products, the more volatile compounds being distilled over. The distillation is stopped when a representative sample of the entire distillate at any particular time shows that substantially all of the carbon tetrachloride has been distilled over, or when a sample of the vapor or of the liquid in the still at any particular time indicates the completion of the tetrachloride distillation.

The analysis of the entire distillate at this point will show the presence of carbon tetrachloride, carbon disulphide and sulphur chloride, and will also show that there are present smaller quantities of the volatile compounds formed by the side reactions, among which may be named trichloromethyl-sulphochloride, $CCl_3SO_2Cl$, (formed if the reacting components contained dissolved water), and the chlormercaptans, especially perchlormethyl-mercaptan. These volatile compounds, the boiling points of some of which are close to that of carbon tetrachloride, are undesirable, since they possess a disagreeable odor and are not removed by the usual alkali treatment or distillations which will presently be described.

The object of this invention is to provide a method for the elimination of undesirable impurities present in crude carbon tetrachloride resulting from a chlorination of carbon disulphide, as by the reaction of the chlorides of sulphur therewith.

This object is attained, briefly speaking, by removing the acid impurities from the crude reaction product by an alkali treatment; by eliminating the undesirable volatile impurities, especially those of the mercaptan variety, by an alkali sulphite treatment; and by separating the other impurities by treatment which will subsequently be pointed out. The process may be carried out by the apparatus diagrammatically illustrated on the accompanying drawing.

Sulphur monochloride, preferably containing some sulphur dichloride, and carbon disulphide in the molecular proportions of two parts of the sulphur chlorides to one part of disulphide are measured or weighed out and then poured into the reacting kettle or still 1, above which and communicating therewith by a pipe 2 is disposed the dephlegmating column 3, equipped with reflux pipe 4 connected to an upper side portion of the still. The iron walls of the reacting kettle, vapor lines, dephlegmating column, etc., may serve as the necessary catalyzer for the reaction. The kettle is closed to the atmosphere, and a reaction takes place, heat being applied if it is desired to increase the rate of reaction, forming carbon tetrachloride and free sulphur, the metallic iron acting as a catalyst to carry the chlorine from the sulphur compound to the disulphide but remaining essentially unchanged by the reaction. Simultaneously with this reaction a variety of side reactions occur, producing small quantities of the other compounds described, so that when the reaction has stopped, there are present in the kettle the following: unreacted carbon disulphide and sulphur monochloride, free sulphur, carbon tetrachloride, and small quantities of more or less volatile side reaction products such as perchlormethyl-mercaptan. Vapors from the mixture due to the heat of the reaction or outside heat supplied to the kettle, rising through the pipe 2 up the column 3, are condensed therein and are refluxed back to the still by the pipe 4, thereby preventing any loss of material by vaporization into the atmosphere. This reflux action is continued, by external heat, for about half an hour, after the first heat of the reaction has been dissipated.

The mixture of compounds resulting from the reaction may now be approximately separated into its more volatile and less volatile constituents. This is effected by raising the temperature in the still 1, as by an indirect heating with steam pipes, so that vapors of carbon disulphide, the volatile compounds produced by the side reactions, carbon tetrachloride, sulphur monochloride, and traces of sulphur are distilled off from the mixture, rising through the pipe 2 through the dephlegmating column 3. The less volatile compounds, viz: the sulphur monochloride, the chlor-mercaptans, and especially the sulphur, are present in relatively small percentages in the vapor, and the sulphur and most of the chlor-mercaptan and monochloride vapors are condensed on their upward passage through the plate column, the condensed liquid being refluxed to the still by the pipe 4. The vapors reaching the top of the column pass to a condenser 5, which may be water or air cooled, the condensate passing from the condenser into the crude distillate storage tank 6. The distillation is continued until a representative sample of the entire crude condensate from the tank 6 shows the following approximate analysis:

|   | Per cent. |
|---|---|
| Carbon disulphide | 20 |
| Carbon tetrachloride | 77 |
| Sulphur monochloride | 3 | which indicates that substantially all the tetrachloride from the reaction kettle has been distilled over; or the reaction may be stopped when a sample of the distillate of the mixture in the tank 1 at any particular time shows that practically all of the tetrachloride has been distilled over. Together with the foregoing constituents there are also present in the condensate small quantities of the volatile constituents resulting from the side reactions such as perchlormethyl mercaptan, and there may be trichloromethyl sulphochloride. Additional amounts of these impurities will be formed if the crude distillate stands for any length of time in an iron container at room temperature.

The crude distillate may now be treated to remove the acidic impurities (essentially sulphur monochloride) and the undesirable products formed by the side reactions. For the elimination of the acidic impurities, by neutralization, an alkali solution, preferably caustic soda, is made up in the dissolving tank 7 of from 5% to 10% strength, preferably 5%. A weak alkali solution is used so that the heat of neutralization resulting from the reaction of the acidic impurities therewith will be absorbed by the large quantity of water of the solution, without a material rise in temperature, thereby avoiding premature boiling of the carbon tetrachloride during treatment. The large volume of solution also facilitates thorough mixing with the tetrachloride and floats thereon because of its low density, trapping and reacting with acid vapors rising therefrom. To the alkali solution in the tank 7 is added an amount of sodium sulphite depending upon the amount of impurity, and determined by test on a small sample. A weight of sulphite equal to the weight of caustic soda used is sufficient to purify a badly contaminated distillate. Or a mixed solution may be made by dissolving caustic soda in water supplied to the tank 7 by a pipe 10 to form an 8% caustic soda solution in the tank and bubbling sulphur dioxide gas into it through the pipe 9 until it has diminished to about 5% sodium hydroxide content. At this time it will also contain about 5% sodium sulphite. A normal crude distillate will require less sulphite; say, one-third of the weight of caustic soda. Commercial cooking acid used in the sulphite pulp process or relief sulphur dioxide gases from the sulphite pulp digesters ordinarily cannot be used for this purpose because of the impurities and terpene odors associated therewith.

The mixed solution is fed from the tank 7 into a closed neutralizing and agitating tank 8, above which and communicating therewith, is disposed a large vapor pipe 15, which may be suitably provided with baffles designed to collect entrained liquid droplets; the upper portion of the pipe 15 is connected to an upper side portion of the tank 8 by a reflux pipe 16, so as to return this collected entrainment to the tank. The top end of the pipe 15 is connected to a condenser 17, discharging into a pipe line 18, operable by a valve 19 either to discharge condensate into the pipe 16, thereby providing a reflux line from the condenser to the tank, or by a valve 20 to discharge into a separator tank 21.

Crude condensate is now run from the tank 6 into the tank 8 in about the proportion of 1000 pounds of condensate to 10–50 pounds of caustic soda and 5–10 pounds of sodium sulphite, the solution of the sodium compounds forming a supernatant layer which is immiscible with the crude condensate layer. To secure intimate contact between the acid impurities of the condensate and the alkali solution so that they may react and form water-soluble neutral products and also to cause a reaction between the volatile side-reaction products and the sodium sulphite in solution, agitators 11 are provided in the tank 8. These are set in operation and thoroughly mix the two layers and bring the components into contact for reaction, so far as they are capable of reaction. Soluble sodium salts and compounds and free sulphur are formed by the reaction of the alkali and the sulphite with some of the impurities of the mixed solution, these salts and compounds being more soluble in water than in carbon tetrachloride. The agitation is stopped after one or two hours and the solution permitted to settle on top of the tetrachloride layer.

To complete the reaction, steam is blown into the mixture, the vapors rising through the pipe 15 into the condenser, being condensed and refluxed by pipes 16 and 18 to the neutralizing tank, thus preventing any loss by vaporization of material into the atmosphere. This is continued for one to two hours, or until a sample of the tetrachloride layer, shaken with distilled water, does not cause the latter to become acid to methyl orange indicator, thus showing that the elimination of the acid and mercaptan impurities has been accomplished. At this point, the charge is allowed to cool and separate into two distinct layers, the alkali layer being carefully drawn off through the pipe 13. Fresh water is added to the charge; the mixture being thoroughly agitated, is allowed to settle, and the water layer is then drawn off. The washing is repeated until the washwater when drawn off is clear and colorless. The washing effects the removal of sodium salts, free sulphur and compounds formed by the reactions, and the removal of any other impurities which are more soluble in water than in carbon tetrachloride, and prevents the development of garlic odors and sulphuric acid-discoloring compounds in the final product. Of course, the acid impurities may first be removed by the alkali treatment and the mercaptan impurities may be then removed by an alkali sulphite treatment, but it is more expedient, in order to save time, to remove both these classes of impurities by a simultaneous treatment.

The neutral tetrachloride in the neutralizing vessel is now distilled out, either by indirectly heating with steam pipes, which must always remain submerged beneath the surface of the liquid, or by directly blowing steam into the vessel, the vapors rising through the pipe 15 to the condenser 17; any entrained droplets of liquid being refluxed by the pipe 16 to an upper side portion of the vessel; failure to remove this entrainment may result in a yellowish product, of undesirable odor. It may be desirable to carry out a fractional distillation, the first portion, rich in carbon disulphide, being returned to a storage tank (not shown) for reconversion into tetrachloride. This distillation affords a thorough separation of all volatile compounds from all non-volatile compounds that may be present in the liquid after neutralization. The condensate is discharged into a separator 21 and is allowed to settle. The water layer together with any other supernatant impurities are drawn off carefully through the pipe 22. After separation, the liquid is discharged into neutral liquid storage tank 24. Any liquid or other impurities heavier than carbon tetrachloride present, settle to the bottom of the separator and may be drawn off through the pipe 23. The neutral distillate may then be dehydrated by passing it through the closed container 25, filled with lumps of fused calcium chloride, or other suitable dehydrating agents, and run into the still 26, the heating coils 37 of which are disposed near the bottom thereof.

The liquid in the still is subjected to a fractional distillation, and the vapors rising through the high rectifying column 27 pass into the condenser 28, which is maintained at a temperature between the boiling-points of carbon disulphide and carbon tetrachloride (the temperature in the vapor space at no time exceeding the boiling-point of carbon tetrachloride). The less volatile constituents which condense therein are suitably refluxed to an upper plate of the column by the pipe 29, and the relatively volatile vapor or vapors pass to the condenser 30, which is cooled by cold water. The reflux pipe 36 is connected to an upper side portion of the still, and the less volatile constituents condensed in the column pass back to the still. The first portion of the distillate is carbon disulphide, which may be suitably conducted by the pipes 31 and 32 to the carbon disulphide storage tank (not shown) for conversion into tetrachloride. The middle portion is a mixture of carbon disulphide and carbon tetrachloride, and is sent back to neutral liquid storage tank 24 through pipes 31 and 33 to be mixed with a subsequent batch of neutralized tetrachloride. The last distillate is carbon tetrachloride, which is again passed by pipe 31 through a closed container 34, filled with lumps of fused calcium chloride, to remove any last traces of water that may be present, and then discharged into storage tank 35. During the last mentioned distillation the level of the liquid is never allowed to fall below the level of the heating pipes, since super-heating of the vapor will result, and may cause the formation of tetrachlor ethylene $C_2Cl_4$ and hexachlorethane, $C_2Cl_6$, both of which have objectionable odors. If this super-heating takes place in the presence of iron rust or of ferric chloride and water vapor, it may cause the formation of phosgene, $CO.Cl_2$, likewise ill smelling.

By practising the process herein described, the carbon tetrachloride, produced by the chlorination of carbon disulphide, is free from thiophosgene and chlorinated mercaptans; sour odors, such as carbon dichloride, or phosgene; camphor odors, such as hexachlorethane, or trichloromethyl sulphochloride; garlic odors; yellow color; and substances which will impart a yellow or brown color to concentrated sulphuric acid when the latter is shaken with the tetrachloride at room temperature. The odors described are most easily detected in an impure product by allowing a few cubic centimeters of the liquid to evaporate slowly from clean filter-paper, noting the odor of the vapor at intervals. Carbon tetrachloride produced by the improved process herein described, when tested in this manner, gives no foreign odor at any stage of the evaporation, and leaves the paper entirely odorless when evaporation of the tetrachloride is complete. It is neutral, water white, and as stated, is free from camphoraceous, alliaceous, sour and chlor-mercaptan odors.

What we claim is:

1. That step in the purification of crude carbon tetrachloride which comprises treating it with an alkali metal sulphite solution.

2. That step in the purification of crude carbon tetrachloride which comprises treating it with sodium sulphite solution.

3. The method of purifying carbon tetrachloride resulting from a chlorination of carbon disulphide which comprises separating the reaction mixture approximately into relatively volatile and non-volatile portions and treating the volatile portion with sodium sulphite solution.

4. That step in the purification of crude carbon tetrachloride resulting from a chlorination of carbon disulphide, which comprises neutralizing the crude distillate from the reaction product with a solution containing sodium sulphite and sodium hydroxide.

5. The method of purifying carbon tetrachloride resulting from a chlorination of carbon disulphide with the chlorides of sulphur, which comprises separating the reaction mixture approximately into relatively volatile and non-volatile portions, and agitating the volatile portion with an alkaline solution and an alkali metal sulphite solution.

6. The method of purifying carbon tetrachloride resulting from a chlorination of carbon disulphide, which comprises separating the reaction mixture approximately into relatively volatile and non-volatile portions, agitating the volatile portion with a distinctly alkaline alkali metal sulphite solution to cause a reaction between the solution and impurities present in said volatile portion, and heating said volatile portion together with the mixed solution to complete the reaction.

7. The method of purifying carbon tetrachloride resulting from a chlorination of carbon disulphide, which comprises fractionally distilling the reaction product, agitating the crude distillate with a distinctly alkaline alkali metal sulphite solution, heating the product with said mixed solution, and repeatedly washing the product with water.

8. The method of purifying carbon tetrachloride resulting from a chlorination of carbon disulphide, which comprises fractionally distilling the reaction product, removing acid impurities and impurities of the thiophosgene and chlor-mercaptan type from the crude distillate with an alkaline solution and an alkali metal sulphite solution so as to produce a liquid neutral to methyl orange indicator, and then separating the neutral liquid from its non-volatile constituents.

9. The method of purifying carbon tetrachloride resulting from a chlorination of carbon disulphide, which comprises fractionally distilling the reaction product, neutralizing the acid impurities in the crude distillate, removing volatile compounds of the thiophosgene and chlor-mercaptan type therefrom with an alkali metal sulphite, and fractionally distilling the resulting neutral product so as to separate the carbon disulphide contained therein from the carbon tetrachloride.

10. The method of purifying carbon tetrachloride resulting from a chlorination of carbon disulphide with the chlorides of sulphur, which comprises separating the mixture into relatively volatile and non-volatile portions, treating the volatile portion with a distinctly alkaline alkali metal sulphite solution so as to produce a neutral liquid, and fractionally distilling said liquid to produce carbon tetrachloride substantially free from objectionable impurities.

11. The method of purifying carbon tetrachloride resulting from a chlorination of carbon disulphide with the chlorides of sulphur, which comprises fractionally distilling the reaction product, treating the crude distillate with a distinctly alkaline alkali metal sulphite solution so as to produce a neutral liquid, and fractionally distilling said liquid so as to separate carbon tetrachloride from the carbon disulphide contained therein.

12. The method of purifying carbon tetrachloride resulting from a chlorination of carbon disulphide with the chlorides of sulphur, which comprises separating the reaction mixture approximately into relatively volatile and non-volatile portions, treating the volatile portion with a distinctly alkaline alkali metal sulphite solution so as to produce a neutral liquid, washing said neutral liquid repeatedly with water, and fractionally distilling said washed product to separate the carbon tetrachloride substantially from the carbon disulphide and completely from the non-volatile impurities contained therein.

13. The method of purifying carbon tetrachloride from a chlorination of carbon disulphide with the chlorides of sulphur, which comprises separating the reaction mixture approximately into relatively volatile and non-volatile portions, treating the volatile portion with a distinctly alkaline alkali metal sulphite solution so as to produce a neutral liquid, washing said neutral liquid repeatedly with water, steam-distilling said washed product, separating the vapors from entrained impure liquid, condensing the vapors, separating the condensed carbon tetrachloride from the condensed water, and drying the carbon tetrachloride.

14. The method of purifying carbon tetrachloride resulting from a chlorination of carbon disulphide with the chlorides of sulphur, which comprises separating the reaction mixture approximately into relatively volatile and non-volatile portions, treating the volatile portion with a distinctly alkaline alkali metal sulphite solution so as to produce a neutral liquid, washing said neutral liquid repeatedly with water, steam distilling said washed product, separating the vapors from entrained impure liquid, condensing the vapors, separating the condensed mixture of carbon tetrachloride and carbon disulphide from the condensed water, drying the mixture by contact with fused calcium chloride, and fractionally distilling the mixture to recover substantially pure carbon tetrachloride therefrom.

15. A method of purifying crude carbon tetrachloride resulting from a chlorination of carbon disulphide, which comprises neutralizing the crude distillate and treating it with a sulphite solution.

In testimony whereof we have affixed our signatures.

WALLACE B. VAN ARSDEL.
HAROLD P. VANNAH.